(No Model.)

F. A. STRATER.
DRAIN FOR SINKS, WASH BOWLS, &c.

No. 404,060. Patented May 28, 1889.

Witnesses;
Herman Strater,
Edw. Dummer.

Inventor;
Francis A. Strater.

UNITED STATES PATENT OFFICE.

FRANCIS A. STRATER, OF BOSTON, MASSACHUSETTS.

DRAIN FOR SINKS, WASH-BOWLS, &c.

SPECIFICATION forming part of Letters Patent No. 404,060, dated May 28, 1889.

Application filed June 12, 1888. Serial No. 277,014. (No model.)

*To all whom it may concern:*

Be it known that I, FRANCIS A. STRATER, a citizen of the United States, residing at Boston, in the county of Suffolk and State of Massachusetts, have invented a new and useful Improvement in Drains for Sinks, Wash-Bowls, &c., of which the following is a specification, reference being had to the accompanying drawings.

The object of my invention is to provide means whereby drains for sinks, wash-bowls, and the like may be readily cleared when they become choked, and also that a removable stand-pipe may be conveniently attached to a drain to retain water within the sink or bowl.

My invention consists in the devices and combinations hereinafter described, and specifically pointed out in the claim.

Figure 1:
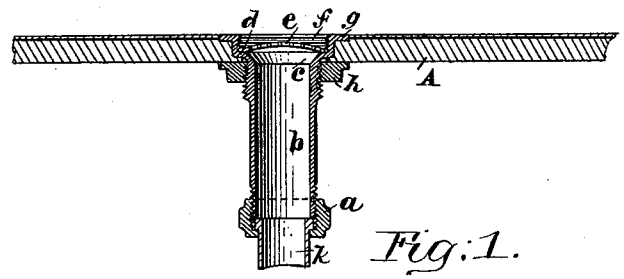
Figure 2:
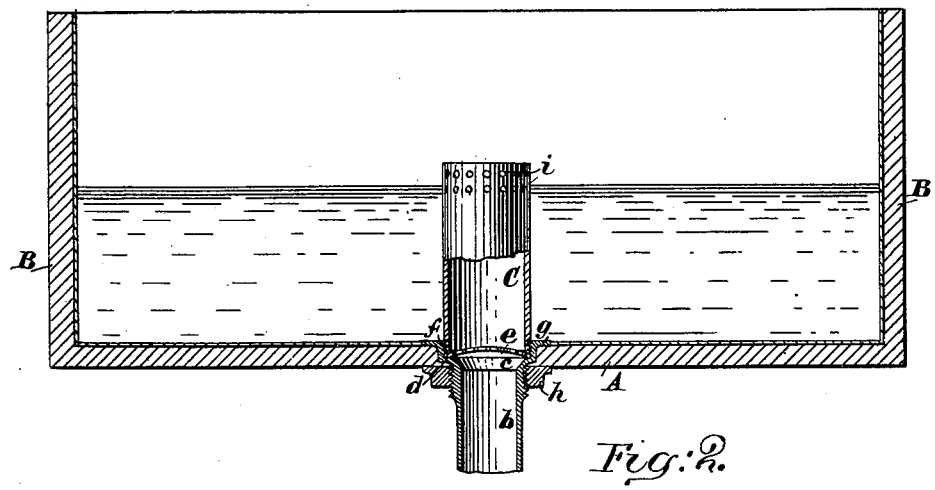
Figure 3:
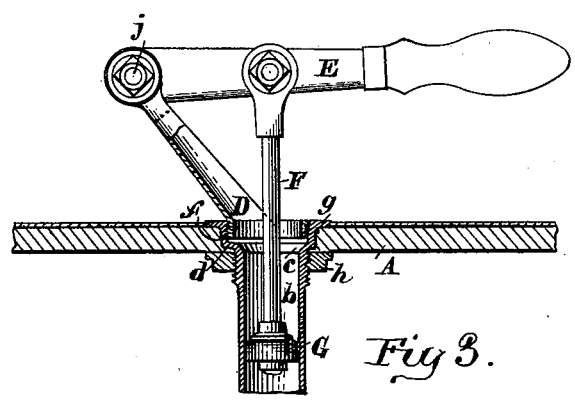

In the drawings, Figure 1 shows a vertical section of so much of a sink and drain as is sufficient to illustrate that part of my invention embodied in the device in use simply as a drain. Fig. 2 is a vertical section of a sink and part of drain with stand-pipe. Fig. 3, for further illustration of my invention, is a vertical section of part of sink and drain and an elevation of the piston and means for operating the same for clearing the drain.

I have shown my invention as applied to a rectangular wooden sink lined with sheet-metal, of which A is the bottom, and B B are the vertical ends. In place of such wooden sink may be one wholly of metal or other material, or a bowl of any desirable shape and material.

While that part of an ordinary drain which extends from the bottom of the sink or bowl to the coupling $a$ consists of a simple short pipe, I make this part as a pump-barrel, $b$. In order to do this and have it suitable to serve the purpose of my invention relating thereto, the barrel $b$ should be of considerable length and be finished on the interior surface, so that a piston will work effectively therein. The upper end of this barrel is flaring at $c$, whereby the piston may be readily inserted in the barrel. Above this flaring part is a shoulder, $d$, on which may rest a perforated removable disk, $e$, which operates as a strainer. Above the barrel I make provision for securing a removable stand-pipe, C, or a removable stand, D, to which is pivoted a lever for operating a piston. Such provision I prefer to be a short cylindrical portion, $f$, made as one piece with the barrel $b$ and threaded interiorly to receive the threaded end of said stand-pipe, or the threaded base of said stand, as shown. The drain may be fastened to sink or bowl, as shown, by means of a flange, $g$, inserted in the upper surface of the sink or bowl, and a flanged nut, $h$, which screws on the exterior of the barrel $b$ against the under surface of the sink or bowl.

The stand-pipe C may be a straight pipe of the required length, threaded, as stated above, and having openings $i$ through the side near the upper end.

To the stand D is pivoted the hand-lever E, as at $j$. To this lever is pivoted a piston-rod, F, on which is a piston, G, preferably provided with a cup-packing, as shown.

In ordinary use simply as a drain the device will be in the condition illustrated by Fig. 1, having the strainer $e$ therein. When it is desirable to have a certain amount of water stand in the sink or bowl, as frequently happens in the business for which this part of the device is especially designed, for washing tumblers, &c., the stand-pipe C is secured in place, as illustrated by Fig. 2, the strainer $e$ remaining. The openings $i$ will also provide a strainer for the overflowing water.

When the drain becomes choked, the stand D is screwed into place and the piston inserted in the barrel, as illustrated by Fig. 3, after the stand-pipe C and strainer $e$ have been removed. On moving the piston down and up by means of the hand-lever, pressure and suction will be caused in the drain, which will act powerfully to dislodge any obstruction in the drain and force the same either down or up, so that it may either be taken out or will be carried off through the drain-pipe $k$.

I claim as my invention—

In combination with a drain for sinks, bowls, &c., formed to perform the function of a pump-barrel, a removable stand secured to the drain, a lever pivoted to said stand, and a piston reciprocated by means of said lever, the drain being adapted to have a stand-pipe secured thereto after the removal of said stand, substantially as and for the purposes set forth.

FRANCIS A. STRATER.

Witnesses:
HERMAN STRATER,
EDW. DUMMER.